US012052164B2

(12) United States Patent
Lipowski et al.

(10) Patent No.: US 12,052,164 B2
(45) Date of Patent: *Jul. 30, 2024

(54) STAR TOPOLOGY FIXED WIRELESS ACCESS NETWORK WITH LOWER FREQUENCY FAILOVER

(71) Applicant: Starry, Inc., Boston, MA (US)

(72) Inventors: Joseph Thaddeus Lipowski, Norwell, MA (US); Volkan Efe, Belmont, MA (US)

(73) Assignee: STARRY, INC., Boston, MA (US)

( * ) Notice: Subject to any disclaimer, the term of this patent is extended or adjusted under 35 U.S.C. 154(b) by 111 days.

This patent is subject to a terminal disclaimer.

(21) Appl. No.: 17/675,350

(22) Filed: Feb. 18, 2022

(65) Prior Publication Data

US 2022/0217077 A1 Jul. 7, 2022

Related U.S. Application Data

(63) Continuation of application No. 16/380,463, filed on Apr. 10, 2019, now Pat. No. 11,303,561.

(Continued)

(51) Int. Cl.
*H04L 12/703* (2013.01)
*H04B 1/00* (2006.01)
(Continued)

(52) U.S. Cl.
CPC ........... *H04L 45/28* (2013.01); *H04B 1/0057* (2013.01); *H04B 1/0064* (2013.01);
(Continued)

(58) Field of Classification Search
CPC ........ H04B 10/25754; H04B 10/25759; H04B 1/0057; H04B 1/0064; H04B 1/0075;
(Continued)

(56) References Cited

U.S. PATENT DOCUMENTS

| 2001/0006517 A1 | 7/2001 | Lin et al. | |
| 2002/0045459 A1* | 4/2002 | Morikawa | H04W 72/0453 455/524 |

(Continued)

FOREIGN PATENT DOCUMENTS

WO    WO 9748196    12/1997

OTHER PUBLICATIONS

Partial Search Report of the International Searching Authority, mailed on Aug. 21, 2019, from International Application No. PCT/US2019/026771, filed on Apr. 10, 2019. 13 pages.

(Continued)

*Primary Examiner* — Awet Haile
(74) *Attorney, Agent, or Firm* — HoustonHogle LLP

(57) ABSTRACT

A fixed wireless access network provides for high-frequency data links between aggregation nodes and endpoint nodes. The system further provides for lower frequency wireless data links, which have carrier frequencies less than high-frequency wireless data links. These lower frequency links provide for auxiliary communications between the aggregation nodes and one or more endpoint nodes. During normal operation, the nodes exchange packet data via the high-frequency data links. However, when impairment of the high-frequency data links is detected, the nodes direct the packet data over the low-frequency data links instead until the high-frequency data links are no longer impaired.

18 Claims, 13 Drawing Sheets

Related U.S. Application Data

(60) Provisional application No. 62/655,351, filed on Apr. 10, 2018.

(51) Int. Cl.

| | | |
|---|---|---|
| *H04B 7/04* | (2017.01) | |
| *H04B 7/06* | (2006.01) | |
| *H04B 10/2575* | (2013.01) | |
| *H04L 12/26* | (2006.01) | |
| *H04L 12/28* | (2006.01) | |
| *H04L 43/10* | (2022.01) | |
| *H04L 45/28* | (2022.01) | |
| *H04Q 11/04* | (2006.01) | |
| *H04W 72/044* | (2023.01) | |
| *H04W 72/0453* | (2023.01) | |
| *H04W 84/12* | (2009.01) | |
| *H04W 88/10* | (2009.01) | |
| *H04L 12/64* | (2006.01) | |

(52) U.S. Cl.
CPC ............ *H04B 1/0075* (2013.01); *H04B 7/04* (2013.01); *H04B 7/0617* (2013.01); *H04B 10/25754* (2013.01); *H04B 10/25759* (2013.01); *H04L 12/2885* (2013.01); *H04L 12/2898* (2013.01); *H04L 43/10* (2013.01); *H04Q 11/0471* (2013.01); *H04W 72/0453* (2013.01); *H04W 72/046* (2013.01); *H04W 84/12* (2013.01); *H04W 88/10* (2013.01); *H04L 2012/6421* (2013.01); *H04L 2012/644* (2013.01)

(58) Field of Classification Search
CPC ... H04B 7/04; H04L 12/2885; H04L 12/2898; H04L 2012/6421; H04L 2012/644; H04L 43/10; H04L 45/28; H04Q 11/0471; H04W 72/0453; H04W 72/046; H04W 84/12; H04W 88/01

See application file for complete search history.

(56) References Cited

U.S. PATENT DOCUMENTS

| | | | |
|---|---|---|---|
| 2005/0249139 A1* | 11/2005 | Nesbit | H04N 21/4788 348/E7.071 |
| 2006/0250316 A1* | 11/2006 | Smith | H01Q 3/12 343/781 CA |
| 2006/0258285 A1* | 11/2006 | Riddles | H04W 48/20 455/73 |
| 2013/0069831 A1* | 3/2013 | Friedman | H01Q 21/065 343/702 |
| 2013/0136001 A1 | 5/2013 | Mese | |
| 2013/0230325 A1* | 9/2013 | Chow | H04B 10/25753 398/67 |
| 2016/0143033 A1 | 5/2016 | Falkenstein, Jr. | |
| 2016/0219606 A1 | 7/2016 | Amano et al. | |
| 2017/0118760 A1 | 4/2017 | Negus et al. | |
| 2017/0214448 A1 | 7/2017 | Lipowski et al. | |
| 2017/0272230 A1* | 9/2017 | Khorami | H04L 5/08 |
| 2018/0262363 A1* | 9/2018 | Chamberlain | H04L 12/2885 |
| 2019/0312347 A1 | 10/2019 | Edwards et al. | |

OTHER PUBLICATIONS

International Search Report and Written Opinion of the International Searching Authority, mailed on Nov. 7, 2019, from International Application No. PCT/US2019/026771, filed on Apr. 10, 2019. 22 pages.

International Preliminary Report on Patentability, mailed on Oct. 22, 2019, from International Application No. PCT/US2019/026771, filed on Apr. 10, 2019. 14 pages.

* cited by examiner

STAR TOPOLOGY FIXED WIRELESS ACCESS NETWORK WITH LOWER FREQUENCY FAILOVER

RELATED APPLICATIONS

This application is a Continuation of U.S. patent application Ser. No. 16/380,463, filed on Apr. 10, 2019, which claims the benefit under 35 USC 119(e) of U.S. Provisional Application No. 62/655,351, filed on Apr. 10, 2018, both of which are incorporated herein by reference in their entirety.

BACKGROUND OF THE INVENTION

Internet service providers (ISPs) have historically used a number of different technologies in their subscriber or access networks to deliver network connectivity to premises such as homes, multidwelling units, and businesses. Initially premises were connected via dial-up connections over POTS lines, or ISDN. Often businesses used T-1 to T-3 connections.

Nowadays, DSL, cable and optical fiber networks are common in urban and metropolitan areas to provide network access.

Fixed wireless network access is another option in some areas. ISPs providing the wireless network access can transmit and receive data to and from endpoint nodes usually at premises as radio waves via transmission towers. This has been typically used in rural areas where cable and optical fiber networks are not available.

SUMMARY OF THE INVENTION

The systems described herein utilize high-frequency wireless data links, typically operating in the 10 GHz to 300 GHz band for communications between aggregation nodes and one or more endpoint nodes such as fixed subscriber nodes and/or multi-dwelling unit nodes, usually in star-topology networks. Nevertheless, the technology also has application to mobile and semi-mobile applications and point-to-points links. This spectral band encompasses millimeter wavelengths (mm-wave) that are typically described as covering the 30 GHz to 300 GHz frequency band.

The presently disclosed systems further provide for lower frequency wireless data links, which have carrier frequencies less than high-frequency wireless data links. These lower frequency links will typically operate in the 1 GHz to 10 GHz band. They provide for auxiliary communications between aggregation nodes and one or more endpoint nodes.

In many of the systems, the aggregation nodes have at least one phased array antenna that divides an area of coverage into multiple subsectors for the high-frequency wireless data links.

Preferably, however the lower frequency wireless data links will utilize directional antennas which cover the entire portion in azimuth that is served by the aggregation node, or at least a sector of coverage of such a node. Further, the lower frequency wireless data links utilize multi-user multiple-input and multiple output (MU-MIMO) technologies supporting multiple spatial streams. Thus, the lower frequency wireless data links may not require directional antennas but can nonetheless maintain simultaneous connections with multiple endpoint nodes.

In operation, the aggregation nodes transmit and receive high-frequency modulated carrier signals to and from the endpoint nodes. These nodes are associated with different subsectors in a preferably azimuthal/horizontal fan pattern of the antennas. By forming beams for these subsectors and towards a specific endpoint nodes or groups of endpoint nodes, and/or simultaneously forming several beams to different endpoint nodes within different subsectors from the same antenna, the aggregation node can communicate with the endpoint nodes, with lower or without interference between nodes.

However, in the event that the high-frequency link between a particular aggregation node and a particular endpoint node is impaired, a low-frequency data link is utilized until the high-frequency link resumes normal operation. A typical reason for such impairment is weather, such as hail or unusually high rainfall, for example.

In general, according to one aspect, the invention features a wireless access system. The wireless access system comprises endpoint nodes installed at premises and an aggregation node for communicating with the endpoint nodes. The aggregation node comprises a phased array antenna system and one or more auxiliary antennas, both of which transmit information to and receive information from the endpoint nodes. The phased array antennas system utilizes high-frequency data links, whereas the auxiliary antennas utilize low-frequency data links.

In embodiments, the aggregation node and endpoint nodes provide wireless connectivity between user devices at the premises containing the endpoint nodes and an internet service provider by exchanging packet data.

The endpoint nodes comprise dual-band antenna systems for transmitting the information to and receiving the information from the aggregation node via both links.

The high-frequency wireless data links operate between 10 and 300 Gigahertz, while the low-frequency wireless data links operate between 1 and 10 Gigahertz.

During normal operation, the packet data is exchanged via the high-frequency wireless data links, and the aggregation node and the endpoint nodes exchange auxiliary communications via the low-frequency wireless data links. However, the aggregation node and the endpoint nodes switch over to exchanging the packet data via the low-frequency wireless data links in response to determining that the high-frequency wireless data links are impaired and resume exchanging the packet data via the high-frequency wireless data links in response to determining that the high-frequency wireless data links are no longer impaired. The aggregation node determines that the high-frequency wireless data links are impaired based on results of ping queries sent from the aggregation node to the endpoint nodes via the high-frequency wireless data links.

In general, according to another aspect, the invention features a method of operation of a wireless access system. An aggregation node transmits information to and receives information from endpoint nodes installed at a premises via high-frequency wireless data links using a phased array antenna system of the aggregation node. The aggregation node also exchanges the information with the endpoint nodes via low-frequency wireless data links using one or more auxiliary antennas of the aggregation node.

In general, according to one aspect, the invention features a wireless access system. The wireless access system comprises endpoint nodes installed at premises and an aggregation node for communicating with the endpoint nodes. The aggregation node comprises an antenna system and one or more auxiliary antennas, both of which transmit information to and receive information from the endpoint nodes. The antenna system utilizes high-frequency data links operating at a frequency of at least 20 Gigahertz (GHz), whereas the auxiliary antennas utilize low-frequency data links operating at a frequency between 1 and 10 GHz.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
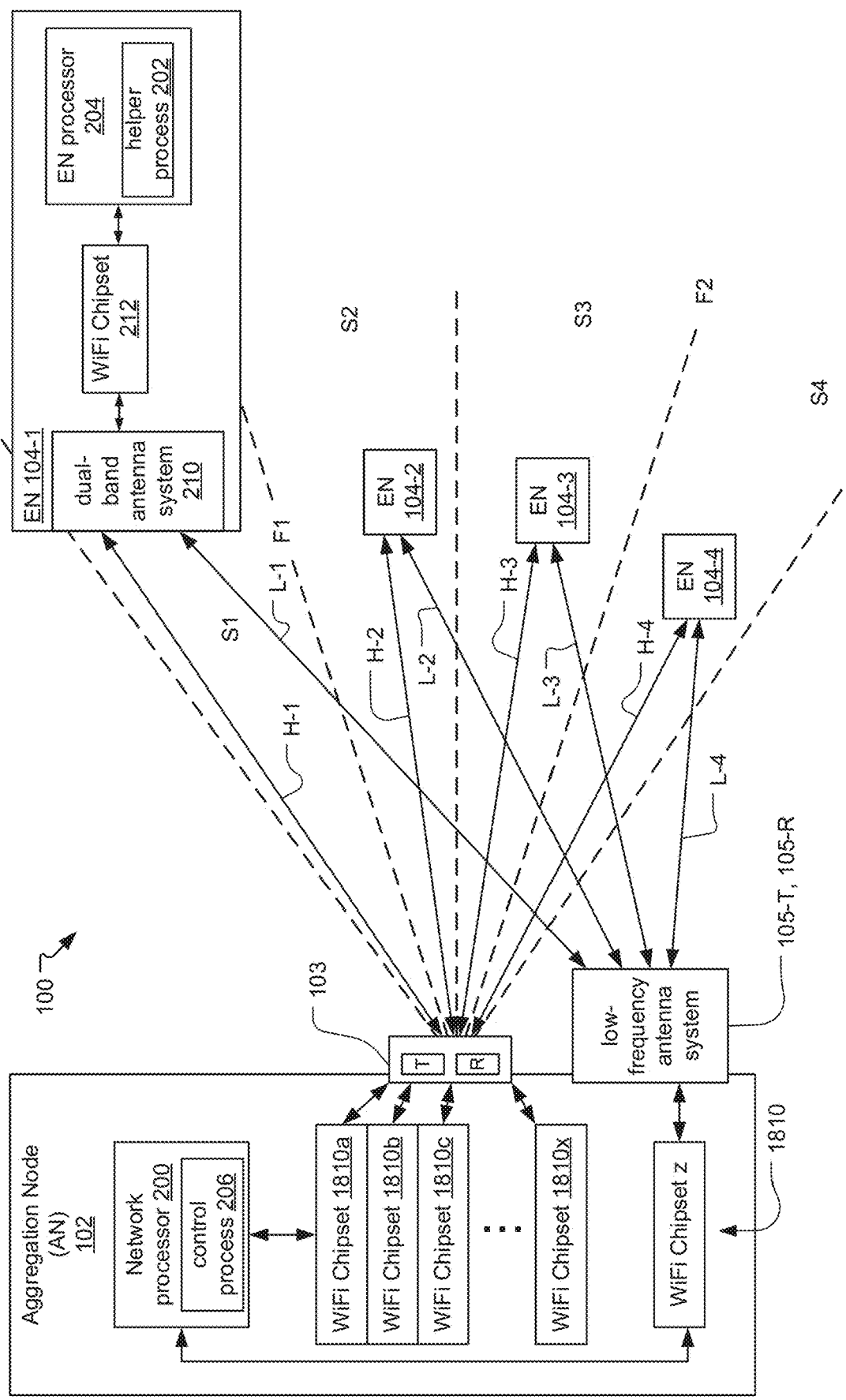
FIG. 1 is a schematic diagram of an exemplary fixed wireless network to which the present invention is applicable.

A fixed wireless network 100 illustrated in FIG. 1 shows an aggregation node (AN) 102 and a plurality of network endpoint nodes (EN) 104, e.g., 104-1, 104-2, 104-3 and 104-4.

In general, the aggregation node 102 distributes packet data to and from the endpoint nodes 104, for example, to provide wireless connectivity between user devices at the premises containing the endpoint nodes 104 and an internet service provider (ISP) wired network. More specifically, the aggregation node 102 receives packet data from one or more networks connected to the fixed wireless network 100 (e.g. the internet) and routes the packet data to the appropriate endpoint nodes 104 of different subscribers. The endpoint nodes 104 then route the packet data to the user devices typically on a local area network of the subscriber. Typically, the endpoint nodes are dedicated to individual subscribers or are dedicated to multi-unit dwellings (MDUs) in which multiple subscribers live. The endpoint nodes 104 also receive the packet data from the user devices and transmit the packet data received from the user devices to the aggregation node 102, which then routes the packet data to the connected networks to be delivered to its destination. In one example, the packet data include individual packets, which are formatted units of data carried by packet-switched networks. In general, the packets include control information and user data. The control information includes data used to route and deliver the user data across the network to the destination, including source and destination network addresses. The user data includes intended messages for the destination devices. One such example of packet data includes packets formatted and processed by networks according to the transmission control protocol (TCP), user datagram protocol, and/or internet protocol (IP), among other examples. In general, the user data is exchanged, in the form of packets, between host devices, which include user devices (e.g. at the different premises) and web and mail servers, among other examples. The user data includes application data such as hypertext transfer protocol (HTTP) request and response messages used by web applications running on the user devices to request and display web content, to name just one example.

Additionally, the aggregation node 102 exchanges auxiliary communications with the endpoint nodes 104, for example, to send instructions to the endpoint nodes 104, which are executed by the endpoint nodes 104. In contrast to the bidirectional packet data (which is associated with devices of the various subscribers), the auxiliary communication pertains, for example, to the functioning of the fixed wireless network 100 and specifically to the data links between the aggregation node 102 and the endpoint nodes 104. For example, the ultimate sources and destinations of the auxiliary communications are the aggregation node 102 and the endpoint nodes 104 themselves, and the messages are used to administer the fixed wireless network 100.

According to a preferred embodiment, the aggregation node includes a network processer 200, multiple WiFi access point chipsets 1810, a high-frequency antenna system 103, and a low-frequency antenna system 105. The network processer 200 generally directs the functionality of the aggregation node by, for example, directing network traffic to and from different endpoint nodes 104 via the WiFi chipsets 1810 and the antenna systems 103, 105. The WiFi chipsets are commercially available systems of one or more chips that implement the IEEE 802.11 standard. These chipsets are capable of maintaining multiple spatial streams such as provided by the IEEE 802.11n, 802.11ac or 802.11ax versions and follow-on versions of the standard. Each of these WiFi chipsets produce WiFi signals, which are signals that have been encoded according to the IEEE 802.11 standard. Each of these WiFi chipsets further decode received WiFi signals. In this way, packet data connectivity is established and maintained between the ISP wired network and each of the endpoint nodes 104.

On the other hand, the endpoint node 104 is a residential or business fixed wireless endpoint that distributes packet data to and from the aggregation node 102 and communicates with the aggregation node 102 via the fixed wireless network 100. The endpoint node 104 includes an endpoint node processor 204, a WiFi chipset 212, and a dual-band antenna system 210. The endpoint node processor 204 generally directs the functionality of the endpoint node by, for example, directing network traffic to and from the aggregation node 102 via the WiFi chipset 212 and the dual-band antenna system 210.

Each endpoint node 104 communicates with the aggregation node 102 by means of an electronic assembly or system that provides a wireless ISP (internet service provider) handoff at the subscriber's premises or MDU where the endpoint node 104 is installed. The endpoint node 104, in a typical residential implementation, communicates with networking devices at the premises such as a modem/router or access point over possibly a WiFi tunnel (in the 2.4 or 5 GHz bands or the WiGig tri-band in the 2.4, 5 and 60 GHz bands, or IEEE 802.11ac IEEE 802.11ad-2012) or via a wired connection (e.g., IEEE 802.3 1000BASE-T). The networking devices then maintain the local area network at the subscriber's premises. In other cases, the endpoint node 104 itself maintains the wired and/or wireless LAN at the premises. It provides typical functions associated with LAN routers, such as Network Address Translation (NAT), guest networks, Parental Controls and other Access Restrictions, VPN Server and Client Support, Port Forwarding and UPnP, and DHCP (Dynamic Host Configuration Protocol) server that automatically assigns IP addresses to network devices on the LAN.

During normal operation, the aggregation node 102 utilizes the high-frequency antenna system 103 to exchange packet data with the endpoint nodes 104-1-104-4 by establishing a high-frequency network (i.e., using high-frequency duplex communication links/radios) comprising high-frequency data links H between the aggregation node 102 and the endpoint nodes 104. The high-frequency antenna system 103 is preferably a phased array antenna system and preferably covers an azimuthal arc of between about 90 degrees and 180 degrees; with about 120 degrees currently being used in some installations and 90 degrees being used in other installations. In some embodiments, the high-frequency network operates at a frequency between 10 and 300 GHz, or more commonly between about 20 and 60 GHz.

The operation of the high-frequency antenna system 103 then divides the antenna's area of coverage into multiple subsectors S1, S2, . . . , Sn. In the illustrated example, the subsectors are distributed in an azimuthal fan, with the subsectors adjoining and typically slightly overlapping one another. There are at least two subsectors; with some embodiments having four, eight or more subsectors. As a result, in typical implementations, each subsector covers an azimuthal arc of between possibly 8 degrees and 60 degrees. Currently, the subsector arc is between about 20 degrees and 30 degrees.

The aggregation node WiFi chipsets 1810a-1810x associated with the high-frequency antenna system 103 produce and decode WiFi signals as previously mentioned. For transmission, the WiFi signals are then upconverted and transmitted to the endpoint nodes 104. In turn, the endpoint nodes transmit high-frequency signals back via the endpoint node dual-band antenna system 210, which signals are downconverted to WiFi signals at the conventional frequencies such as 2.4 or 5 GHz.

These WiFi chipsets 1810a-1810x are allocated to their own, one or more, subsectors S1, S2, . . . , Sn. Further, their WiFi signals originate on different frequencies and are also preferably up and down converted to different carrier frequencies to minimize inter-chipset interference. Thus, for example, WiFi chipset 1810a might communicate with nodes in subsectors S1 and S2 at frequency F1, whereas WiFi chipset 1810b might communicate with nodes in subsectors S3 and S4 at frequency F2, with 1810a and 1810b producing two different frequency outputs.

The high-frequency antenna system 103 forms transmit and receive beams that correspond to each of the subsectors. In this way, the aggregation node 102 reduces interference between endpoint nodes, conserves power on the downlinks and reduces transmit power requirements by the endpoint nodes on the uplinks.

The endpoint nodes 104 are distributed within and thereby associated with different subsectors. In the illustrated example, endpoint node 104-1 is associated with subsector S1, endpoint node 104-2 is associated with subsector S2, endpoint node 104-3 is associated with subsector S3, and endpoint node 104-4 is associated with subsector S4. However, more than one endpoint node 104 can be in each subsector, or a particular subsector can contain no endpoint nodes 104.

In some embodiments, the high-frequency antenna system 103 produces a number of beams for the endpoint node/ group of endpoint nodes in each subsector S1, S2, . . . , Sn. The high-frequency antenna system 103 typically includes one or more transmit phased array antennas 103-T for transmitting data streams to the endpoint nodes 104 and one or more receive phased array antennas 103-R for receiving data streams from the endpoint nodes 104.

In situations when normal operation is impossible or may be impaired (for example, when the high-frequency data link H between the aggregation node 102 and one or more endpoint nodes 104 is slow to respond, perhaps due to weather), an auxiliary low-frequency network, which is otherwise used to exchange auxiliary communications such as instructions between the aggregation node 102 and the endpoint nodes 104, is then further utilized to carry the subscriber packet data (i.e., using low-frequency communication links/radios). The low-frequency network comprises low-frequency data links L between the aggregation node 102 and the endpoint nodes 104 via the low-frequency antenna system 105 and the dual-band antenna system 210. The low-frequency antenna system 105 is preferably a 5 GHz antenna array, including omni-directional or directional antennas. The lower frequency data links L have carrier frequencies less than high-frequency wireless data links H. In some embodiments, the low-frequency network operates at a frequency in the 1 GHz to 10 GHz band.

According to one embodiment, the low-frequency antenna system 105 is a 2×2 single-user multiple-input and multiple output (SU-MIMO) antenna array with one of the transmit/receivers assigned to vertical polarization and the other assigned to horizontal polarization.

According to an alternative embodiment, the low-frequency antenna system 105 is a multi-user multiple-input multiple-output (MU-MIMO) antenna array supporting multiple spatial streams capable of maintaining simultaneous connections. This can include two half sector antennas, each assigning 1 transmitter/receiver to horizontal and one to vertical for each of the two half-sectors respectively.

In general, a control process 206 executing on the network processor of the aggregation node 102 directs the process of detecting whether the high-frequency data link H between the aggregation node 102 and that particular endpoint node 104 has been impaired. The control process 206 measures the round-trip time for messages (e.g. ping queries) sent and echoed back between the aggregation node 102 and the endpoint nodes 104 via both the high-frequency and low-frequency networks. If it is determined that the high-frequency data link H has been significantly impaired, the control process 206 sends instructions to a helper process 202 executing on the endpoint node processor 204 of the endpoint node 104 to direct traffic for the affected endpoint node over the low-frequency network.

Figure 2:
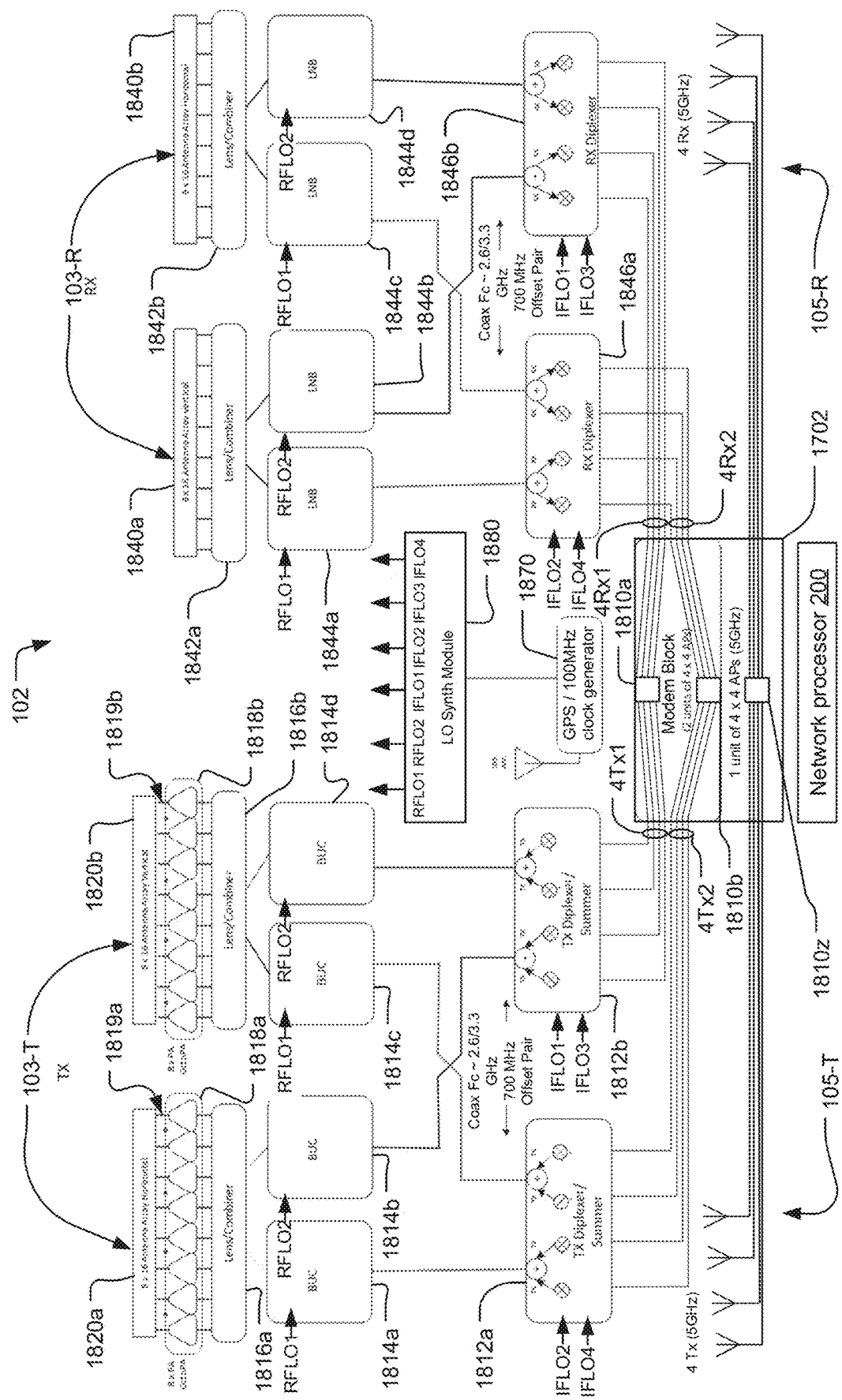
FIG. 2 is schematic diagram for an exemplary aggregation node.

FIG. 2 illustrates an exemplary schematic for the aggregation node 102 that utilizes the high-frequency antenna system (e.g. phased array antenna system) 103T, 103R to communicate with multiple subscriber nodes 104, where the phased array antenna system 103 divides an area of coverage into multiple subsectors.

The embodiment leverages MU-MIMO WiFi chipsets that implement the IEEE 802.11ac version of the standard and follow-on versions. MU-MIMO relies on spatially distributed transmission resources. In particular, MU-MIMO WiFi chipsets encode information into and decode information from multi spatial stream WiFi signals associated with multiple subscribers or users.

Considering the transmission side/path, data to be transmitted (e.g., data from a fiber coaxial backhaul of the ISP network) is provided to two 4-port mu-MIMO WiFi access point chipsets 1810a, 1810b.

The WiFi chipsets 1810a, 1810b produce eight 5 to 6 GHz WiFi signals that are output on two signal paths Tx1, Tx2 (i.e., 4 WiFi signals on Tx1 and other 4 WiFi signals on Tx2). The WiFi signals are provided to two transmit diplexers 1812a, 1812b.

Each of the two transmit diplexers 1812a, 1812b uses fixed local oscillator signals (IFLO1, IFLO2, IFLO3, IFLO4) to down-convert the 5 to 6 GHz WiFi signals to intermediate frequency (IF) signals (IF1, IF2, IF3, IF4) in a range of 2 to 3 GHz. In some implementations, the IFLO signals are in the range of 7.8-8.2 GHz.

At each transmit diplexer, IF1 and IF2 signals are combined (summed/added) to form one IF signal, and IF3 and IF4 signals are combined to form another IF signal. In this way, the WiFi signal are multiplexed into IF signals. Preferably the IF signals are offset by over 100 MHz, such as by 700 MHz.

These combined IF signals from the two diplexers 1812a, 1812b are provided to four block up convertors (BUCs) 1814a, 1814b, 1814c, 1814d.

The BUCs 1814a, 1814b, 1814c, 1814d upconvert the combined IF signals to high-frequency signals. The upconverted IF signals are provided as inputs to a phase control device that includes one or more 8-port Rotman lens 1816a, 1816b, in this specific implementation. The phase control device is configured to feed the transmit phased array antenna system 103T (e.g., transmit antenna arrays 1820a, 1820b of the phased array antenna system) via a set of feedlines 1819a, 1819b. In particular, Rotman lens 1816a feeds a horizontal polarization transmit antenna array 1820a and Rotman lens 1816b feeds a vertical polarization transmit antenna array 1820b. In some implementations, the upconverted IF signals are combined at a combiner associated with each Rotman lens 1816a, 1816b.

The Rotman lens 1816a, 1816b vary phases of the upconverted high-frequency signals to, in combination with the transmit antenna arrays 1820a, 1820b, steer the high-frequency signals towards one or more subsectors in the area of coverage. Specifically, the upconverted signals are directed to different ports of the Rotman lens 1816a, 1816b. The Rotman lens 1816a, 1816b control phases of the upconverted signals to be fed to an amplifier system and then to the transmit antenna arrays 1820a, 1820b. The amplifier system includes power amplifiers 1818a, 1818b provided at output ports of the Rotman lens 1816a, 1816b. The amplifier system amplifies the feeds on the feedlines 1819a, 1819b to the transmit antenna arrays 1820a, 1820b.

The BUCs 1814a, 1814b, 1814c, 1814d use a first frequency local oscillator signal RFLO1 or a second frequency local oscillator signal RFLO2 that are frequency shifted from each other by 380 MHz. These local oscillator signals are utilized to convert the IF signals received from the diplexers 1812a, 1812b to the high-frequency signals for transmission. The center frequencies of the high-frequency signals, however, are shifted with respect to each other.

In more detail, BUCs 1814a, 1814c receive RFLO1 and BUCs 1814b, 1814d receive RFLO2. This arrangement results in the two WiFi chips sets operating at different center frequencies that are shifted with respect to each other in the high-frequency signals for transmission. This occurs because the 4Tx1 signals from the first WiFi chipset 1810a are routed from the TX diplexer 1812b to BUCs 1814b, 1814d. In contrast, the 4Tx2 signals from the second WiFi chipset 1810b are routed from the TX diplexer 1812a and to BUCs 1814a, 1814c.

A 100 megahertz signal received from GPS disciplined 100 MHz clock generator 1870 is converted to RFLO synthesizer signals (RFLO1, RFLO2) by driving a synthesizer module 1880. Preferably, generator module 1870 and the synthesizer module 1880 also generate the IFLO signals used by the transmit diplexers 1812a, 1812b to convert WiFi signals to IF signals.

The output ports of each of the two Rotman lenses 1816a, 1816b feed into eight parallel amplifiers 1818a, 1818b for each antenna array 1820a, 1820b. These eight amplifiers 1818a, 1818b for each of the Rotman lenses 1816a, 1816b feed into the two 8×16 antenna arrays 1820a and 1820b. However, 8×8, 8×10, 8×12, 8×18 antenna arrays might other be selected depending on the link budget requirement.

One of the transmit antenna arrays 1820a then transmits the high-frequency signals associated with Rotman lens 1816a with a horizontal polarization and the other transmit antenna array 1820b transmits the high-frequency signals associated with Rotman lens 1816b with a vertical polarization. The polarization diversity can be achieved by adding a polarizing sheet in front of one of the antennas to rotate its emissions.

On the receive side/path, two 8×16 receive antenna arrays 1840a, 1840b of the receive phased array antenna system 103R are provided. 8×8, 8×10, 8×12, 8×18 antenna arrays might be used in the alternative, however. Antenna array 1840*a* operates at a horizontal polarization and the other antenna array 1840*b* operates at a vertical polarization. The eight output ports of each of the two antenna arrays 1840*a*, 1840*b* feed into the phase control device that includes one or more 8-port Rotman lens 1842*a*, 1842*b*.

The Rotman lens phase control devices 1842*a*, 1842*b* receive high-frequency signals from one or more subsectors and/or different directions associated with the one or more subsectors simultaneously. In particular, Rotman lens 1842*a*, 1842*b* receives high-frequency signals at one or more of its input ports and controls the phases of the received signals to produce outputs to low noise block-down converters (LNBs) 1844*a*, 1844*b*, 1844*c*, 1844*d*, in which pairs of outputs corresponds to a unique subsector of the corresponding receive antenna array 1840*a*, 1840*b*. Each of the two Rotman lenses 1842*a*, 1842*b* produces two outputs that feed into two LNBs. For example, Rotman lens 1842*a* feeds into LNBs 1844*a*, 1844*b*, and Rotman lens 1842*b* feeds into LNBs 1844*c*, 1844*d*. Outputs from LNBs 1844*a* and 1844*c* (with different polarizations) correspond to one subsector and the outputs from LNBs 1844*b* and 1844*d* (with different polarizations) correspond to another subsector.

The received high-frequency signals at receive antenna arrays 1840*a*, 1840*b* are combined at a combiner associated with each Rotman lens 1842*a*, 1842*b*. The combiner vectorially sums the received high-frequency signals present at the antenna ports to be presented to one LNB input, such that each LNB 1844*a*, 1844*b*, 1844*c*, 1844*d* then receives one formed beam. However, an alternative method of beamforming can be utilized where each signal is provided to the LNB and the outputs from the LNB can be summed to form a beam.

The LNBs 1844*a*, 1844*b*, 1844*c*, 1844*d* also use the local oscillator signals RFLO1 and RFLO2 generated by the synthesizer module 1880 for converting the high-frequency signals received at the antenna arrays 1840*a*, 1840*b* to IF signals. Each subsector is handled by only one of the WiFi chipsets 1810*a* or 1810*b*, and also operates at a different center in the high frequencies. LNBs 1844*a* and 1844*c* receive RFLO1. In contrast, LNBs 1844*b* and 1844*d* receive RFLO2. As a result, despite the WiFi signals from two WiFi chipsets being upconverted and transmitting at different high-frequency center frequencies, they are downconverted to the same IF frequencies.

The four low noise block-down converters 1844*a*, 1844*b*, 1844*c*, 1844*d* feed into two receive diplexers 1846*a*, 1846*b*. The inputs to the diplexers 1846*a*, 1846*b* are the IF signals of 2 to 3 GHz. The diplexer demultiplexes the two offset signals in each IF signal. Specifically, receive diplexer 1846*a* produces four Rx2 WiFi signals that will be processed by the second mu-MIMO WiFi chipset 1810*b*. In contrast, receive diplexer 1846*b* produces four Rx1 WiFi signals that will be processed by the first mu-MIMO WiFi chipset 1810*a*.

On the other hand, for the low-frequency antenna system 105, data to be transmitted is provided to a 4-port mu-MIMO WiFi chipset 1810*z*, which is implemented on the modem board at the SH modem block 1702. The WiFi chipset 1810*z* produces four 5 to 6 GHz WiFi signals, which are output by four antennas of the low-frequency transmission antenna system 105-T. At the same time, four antennas of the low-frequency receiving antenna system 105-R receive WiFi signals that will be processed by the WiFi chipset 1810*z*.

Figure 3:
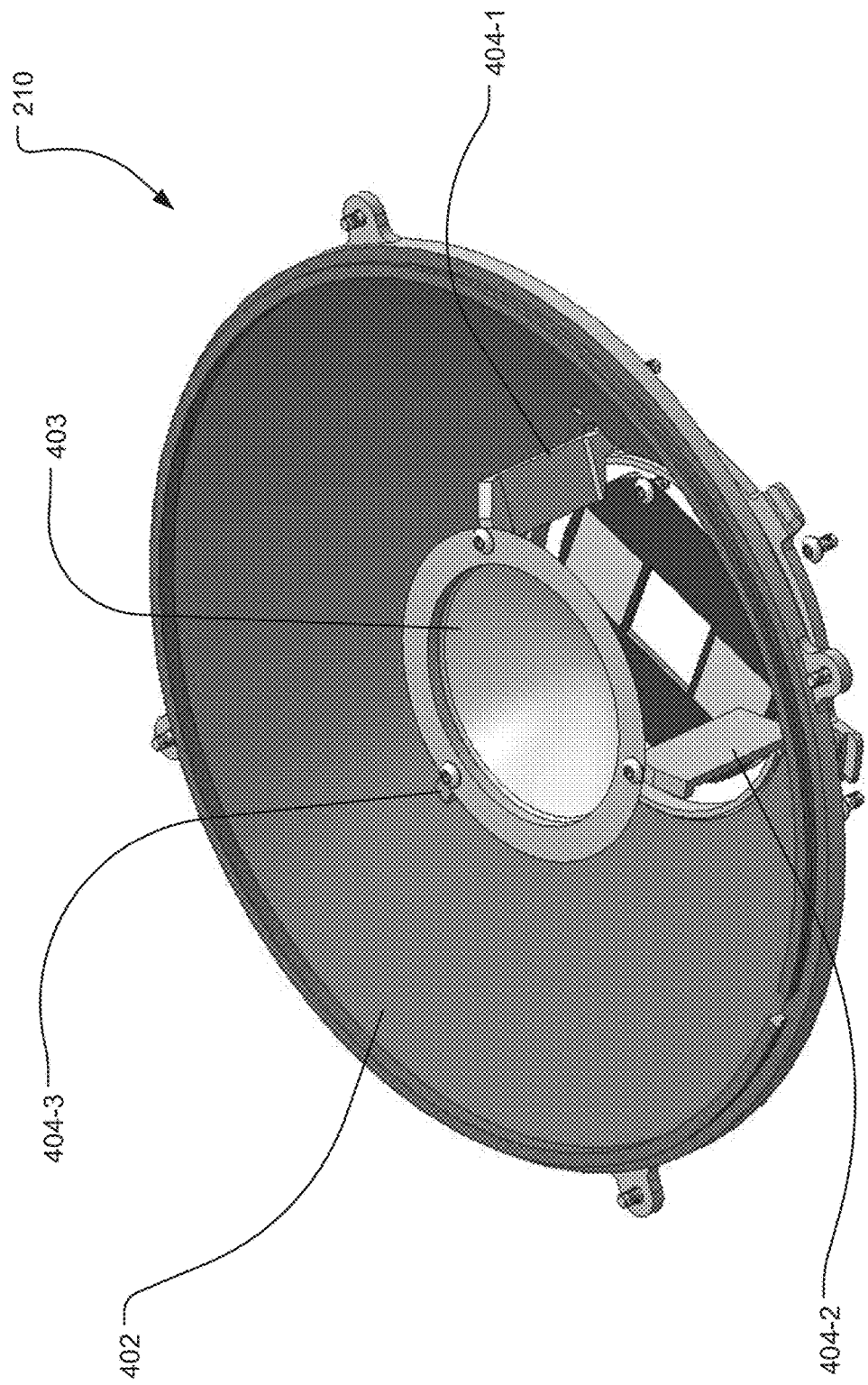
FIG. 3 is a perspective view of the dual-band antenna system according to an embodiment of the current invention.

FIG. 3 is a perspective view of the dual-band antenna system 210 of the endpoint nodes 104 according to one embodiment. This design is of the dual-band antenna system 210 is a dual feed Cassegrain antenna.

A convex sub reflector 403 is secured in a position suspended above a parabolic main reflector 402 by three struts 404-1, 404-2, 404-3 at the focal point of the main reflector 402.

Figure 4:
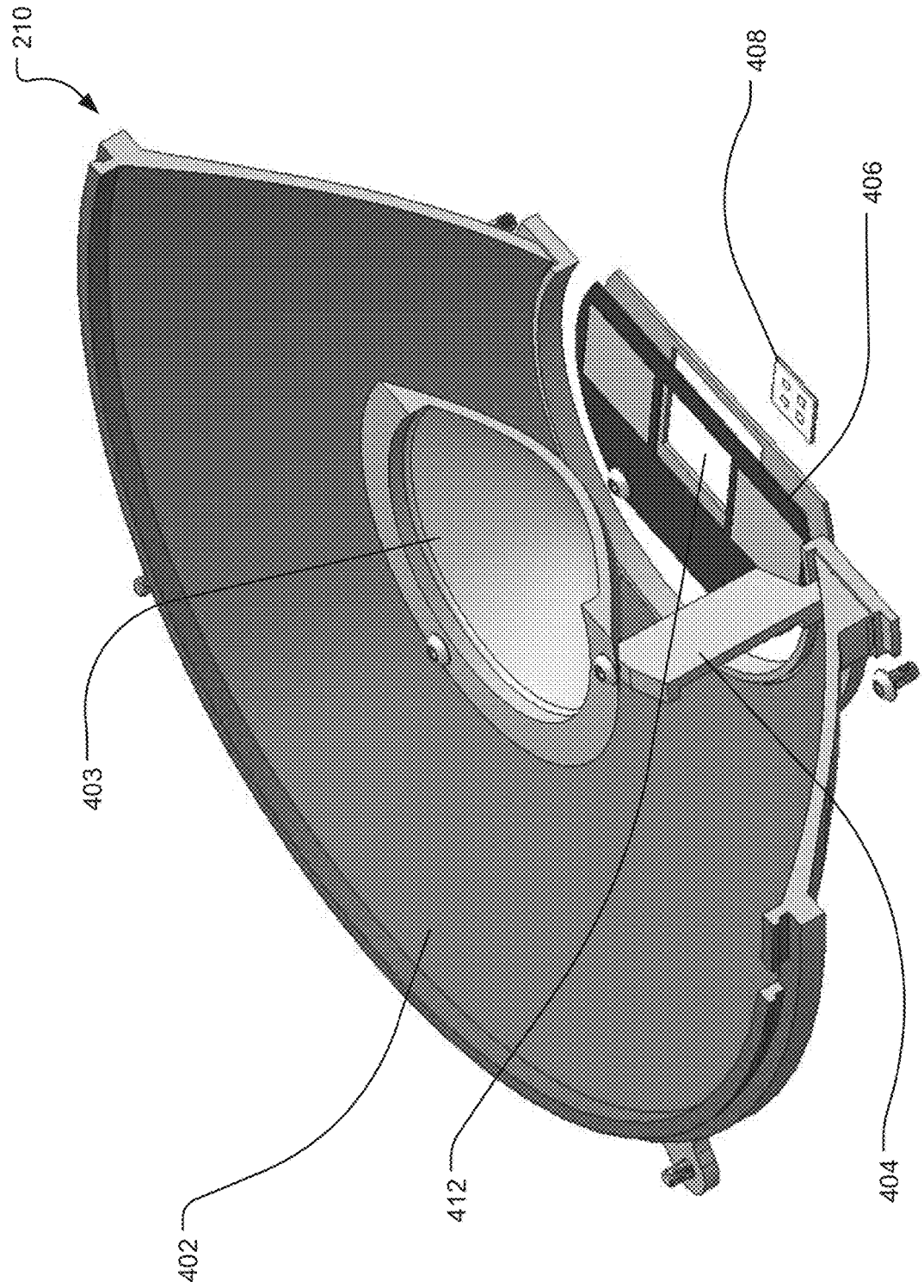
FIG. 4 is a perspective view of the dual-band antenna system with a portion cut away to show feed antennas of the dual-band antenna system.

FIG. 4 is a perspective view of the dual-band antenna system 210 with a portion cut away to show a 5 GHz feed antenna 406 and a 38 GHz feed antenna 408.

In general, beams emanating from the feed antennas 406, 408 illuminate the sub-reflector 403 which then reflects to the main reflector 402 which forms the desired antenna pattern and gain.

The 38 GHz feed antenna 408 and 5 GHz feed antenna 406 are on different planes, with the 5 GHz feed antenna 406 positioned between the 38 GHz feed antenna 408 and the sub reflector 403. The 5 GHz feed antenna 406 includes an opening 412 that provides a path for the 38 GHz beam between the 38 GHz feed antenna 408 and the sub reflector 403.

Both feed antennas 406, 408 use dual polarized aperture coupled patch antenna technology on various substrate material. The feed antennas 406, 408 are dual polarized so that they have two ports, one for transmitting and receiving vertical polarization only and one for transmitting and receiving horizontal polarization only. As a result, each feed antenna 406, 408 has two Tx and two Rx streams.

The 38 GHz feed antenna 408 is configured as a 2×2 array to be able to effectively illuminate the sub reflector 403 and can be a standalone board or integrated into a main radio board of the dual-band antenna system 210.

The 5 GHz feed antenna 406 is configured as a 2×1 array. The phase center of the 5 GHz feed antenna 406 is positioned in the center of the antenna board where a square opening 412 allows the 38 GHz beam to penetrate through to or from the 38 GHz feed. antenna 408.

Figure 5:
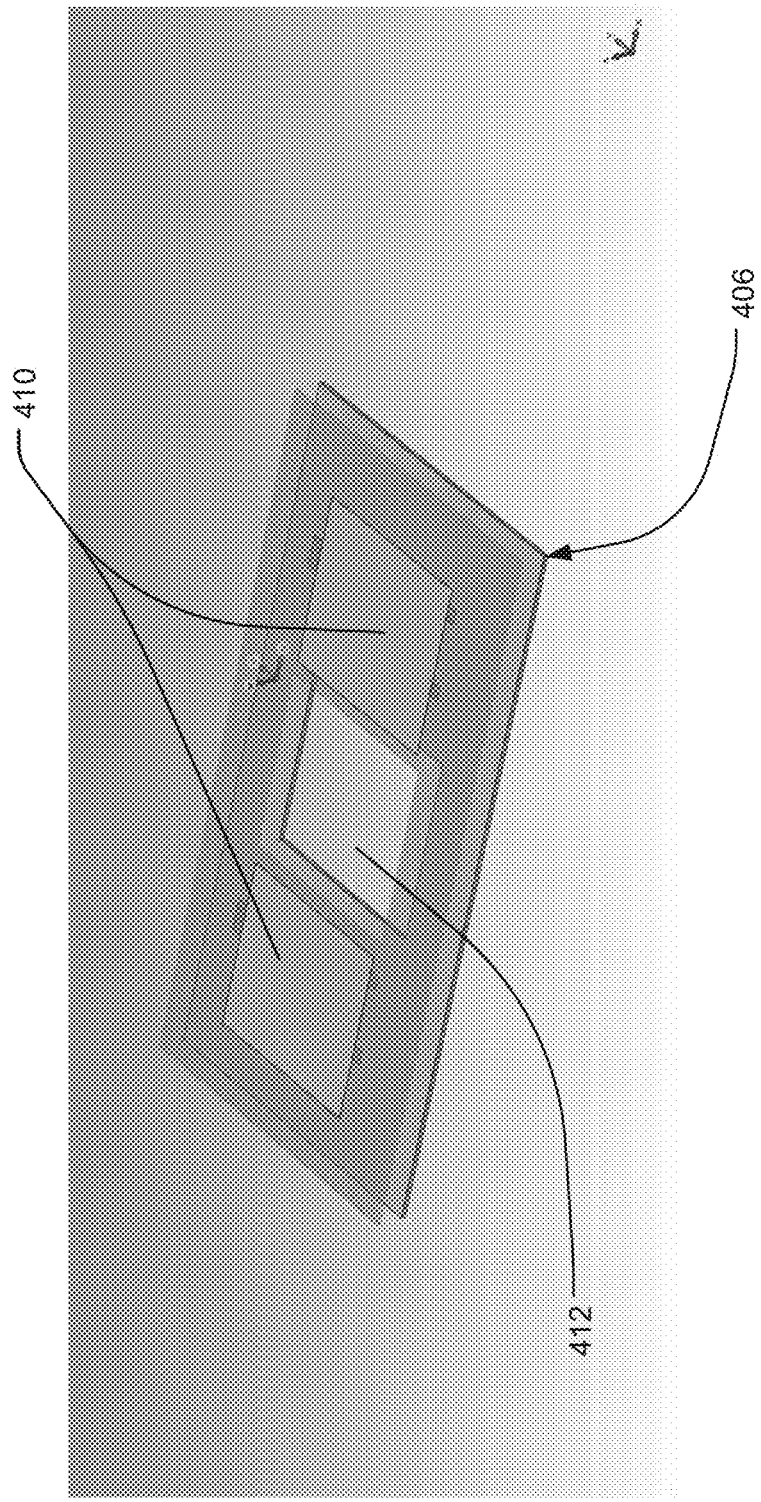
FIG. 5 is a perspective view of the 5 GHz feed antenna.

FIG. 5 is a perspective view of the 5 GHz feed antenna 406, showing the square opening 412 between two 5 GHz antenna patches 410, the patches being arranged in a 2×1 array.

Figure 6:
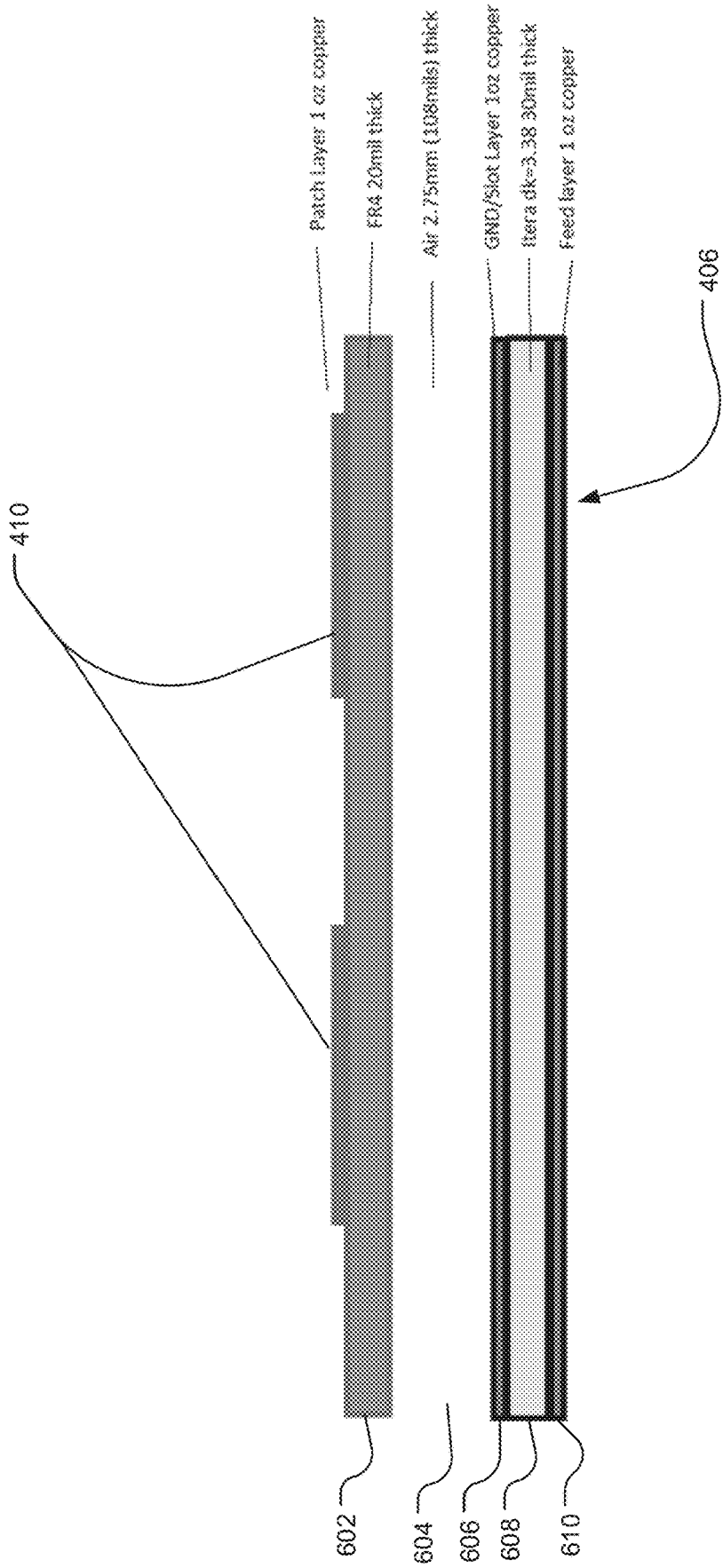
FIG. 6 is a side view of the 5 GHz feed antenna.

FIG. 6 is a side view of the 5 GHz feed antenna 406, showing the 5 GHz antenna patches 410, an upper substrate layer 602, an air layer 604, a ground layer 606, a lower substrate layer 608, and a feed network layer 610. The 5 GHz antenna patches 410 are embedded in the upper substrate layer 602, which is separated from the ground layer 606 by the air layer 604 to increase the antenna bandwidth. The ground layer 606 is separated from the feed network layer 610 by a lower substrate layer 608.

Figure 7:
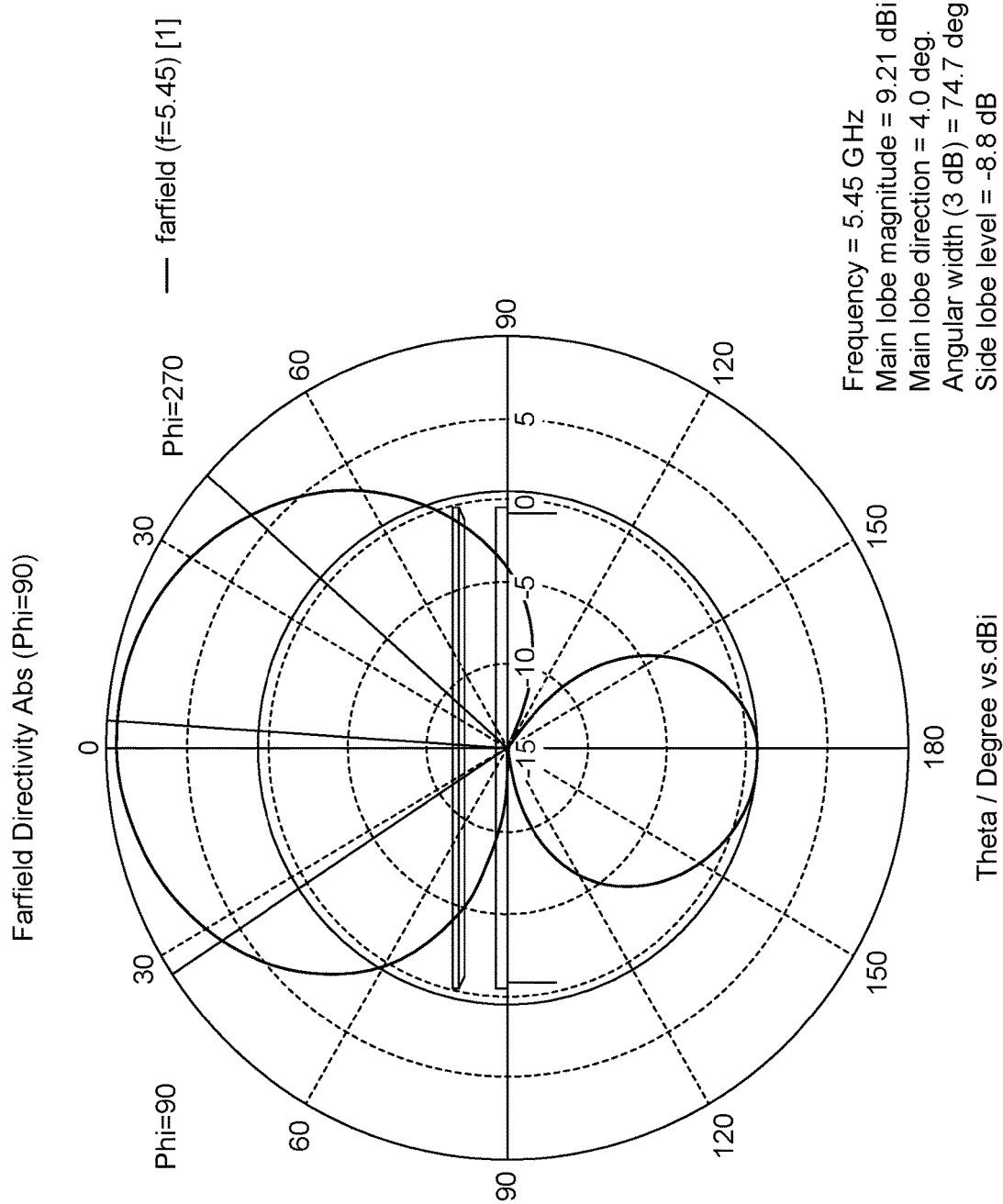
FIG. 7 shows a radiation pattern for the 5 GHz feed antenna.

FIG. 7 shows a radiation pattern for the 5 GHz feed antenna 406.

Figure 8:
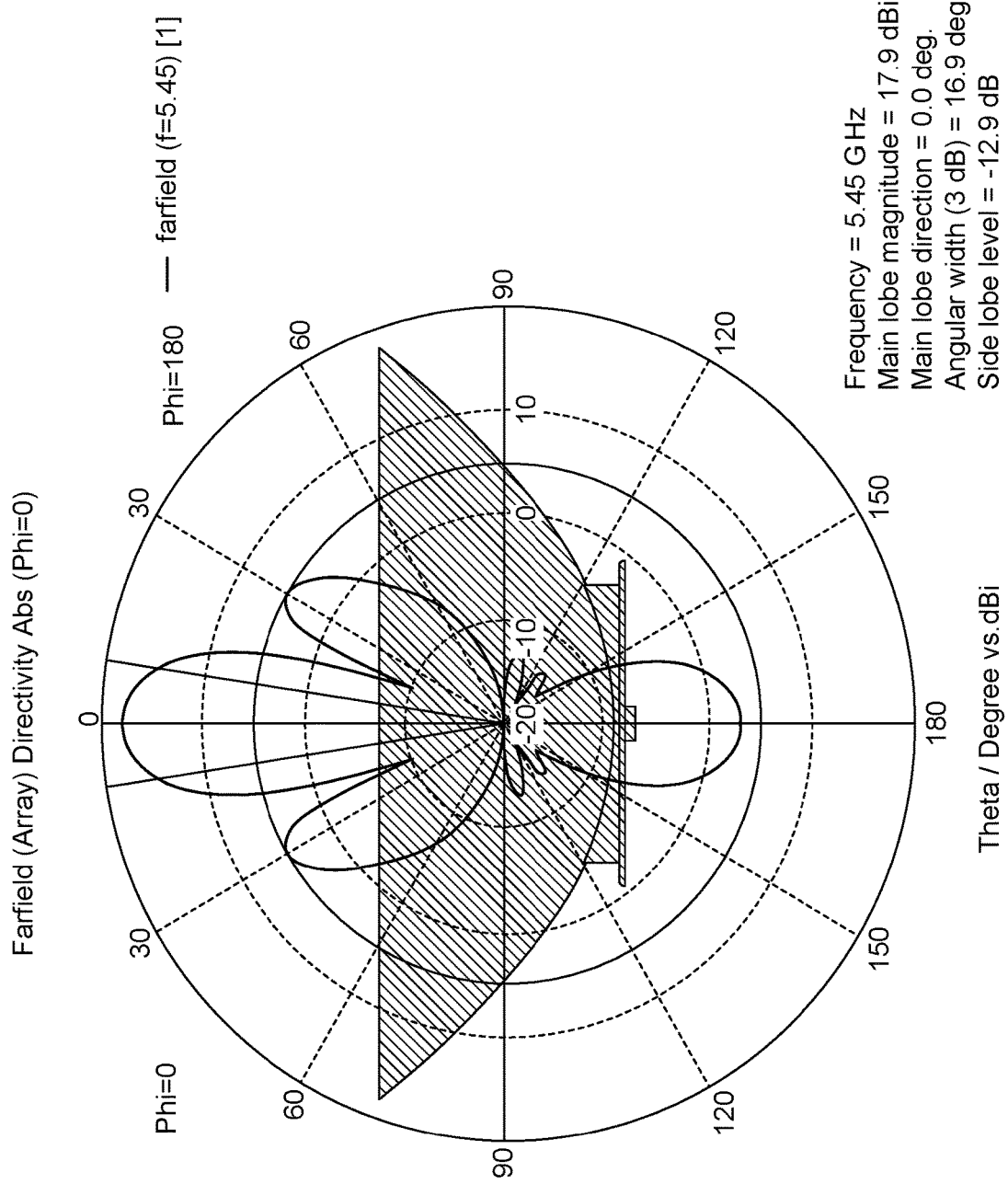
FIG. 8 shows a radiation pattern for the 5 GHz feed antenna when operating with the reflectors of the dual-band antenna system.

FIG. 8 shows a radiation pattern for the 5 GHz feed antenna 406 when operating with the reflectors 402, 403 of the dual-band antenna system 210.

Figure 9:
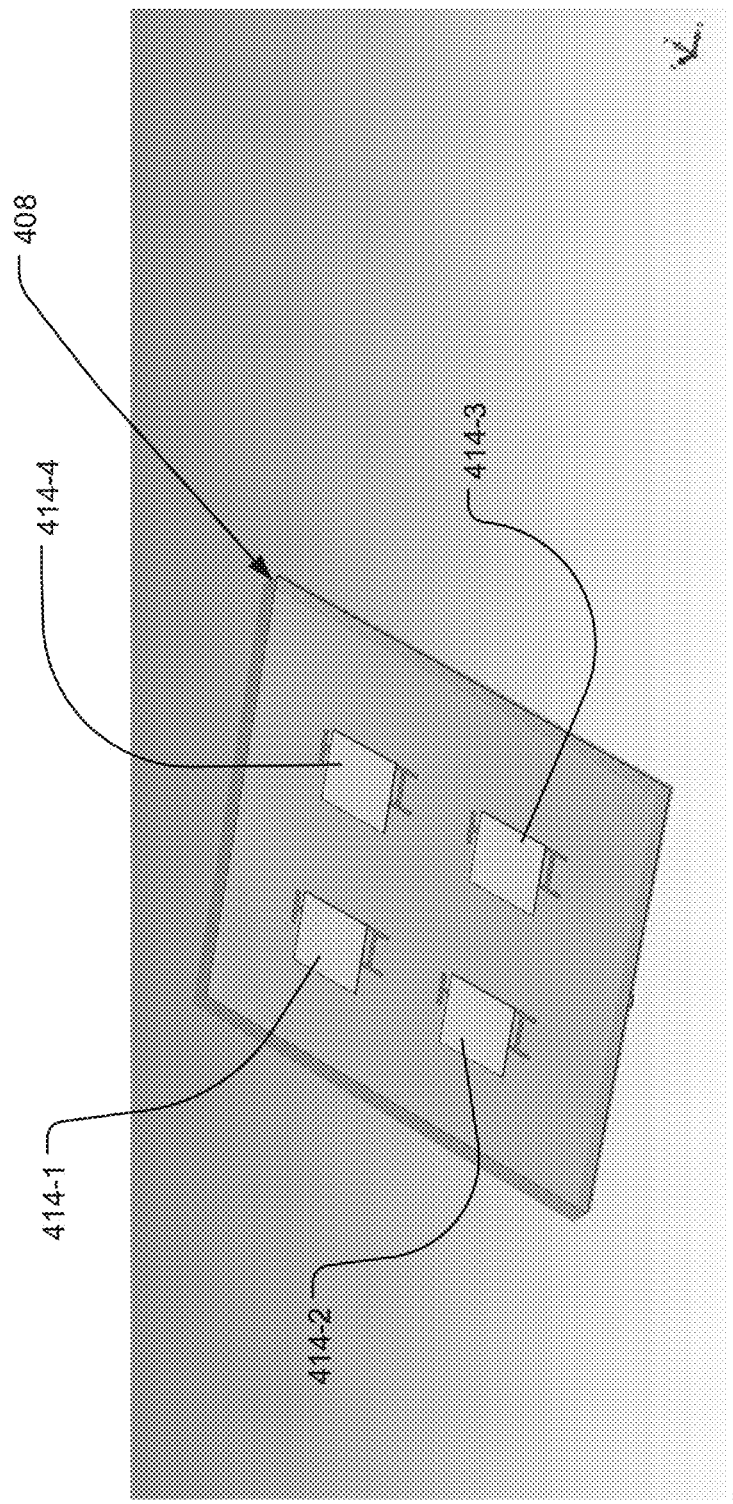
FIG. 9 is a perspective view of the 38 GHz feed antenna.

FIG. 9 is a perspective view of the 38 GHz feed antenna 408, showing four 38 GHz antenna patches 414 arranged in a 2×2 array.

Figure 10:
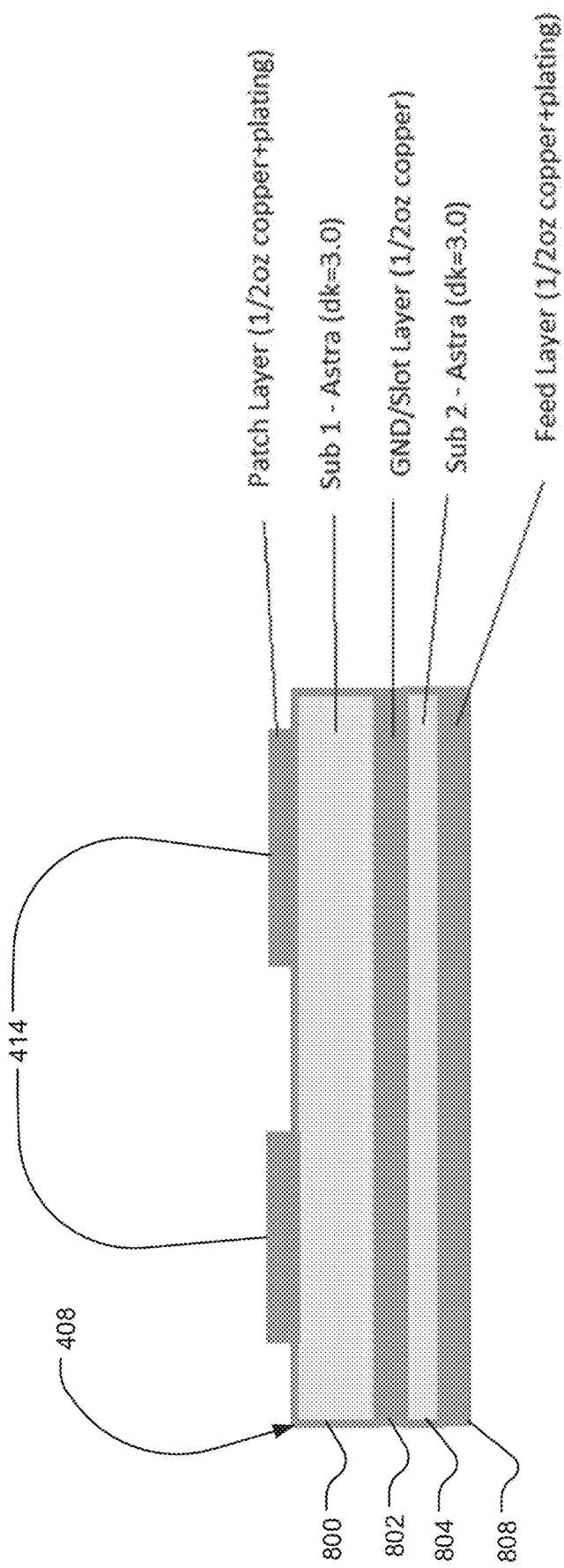
FIG. 10 is a side view of the 38 GHz feed antenna.

FIG. 10 is a side view of the 38 GHz feed antenna 408, showing the 38 GHz antenna patches 414, an upper substrate layer 800, a ground layer 802, a lower substrate layer 804, and a feed network layer 808. The 38 GHz antenna patches 414 are embedded in the upper substrate layer 800, which separates the patches from the ground layer 802. Similarly, the ground layer 802 is separated from the feed network layer 808 by a lower substrate layer 808.

Figure 11:
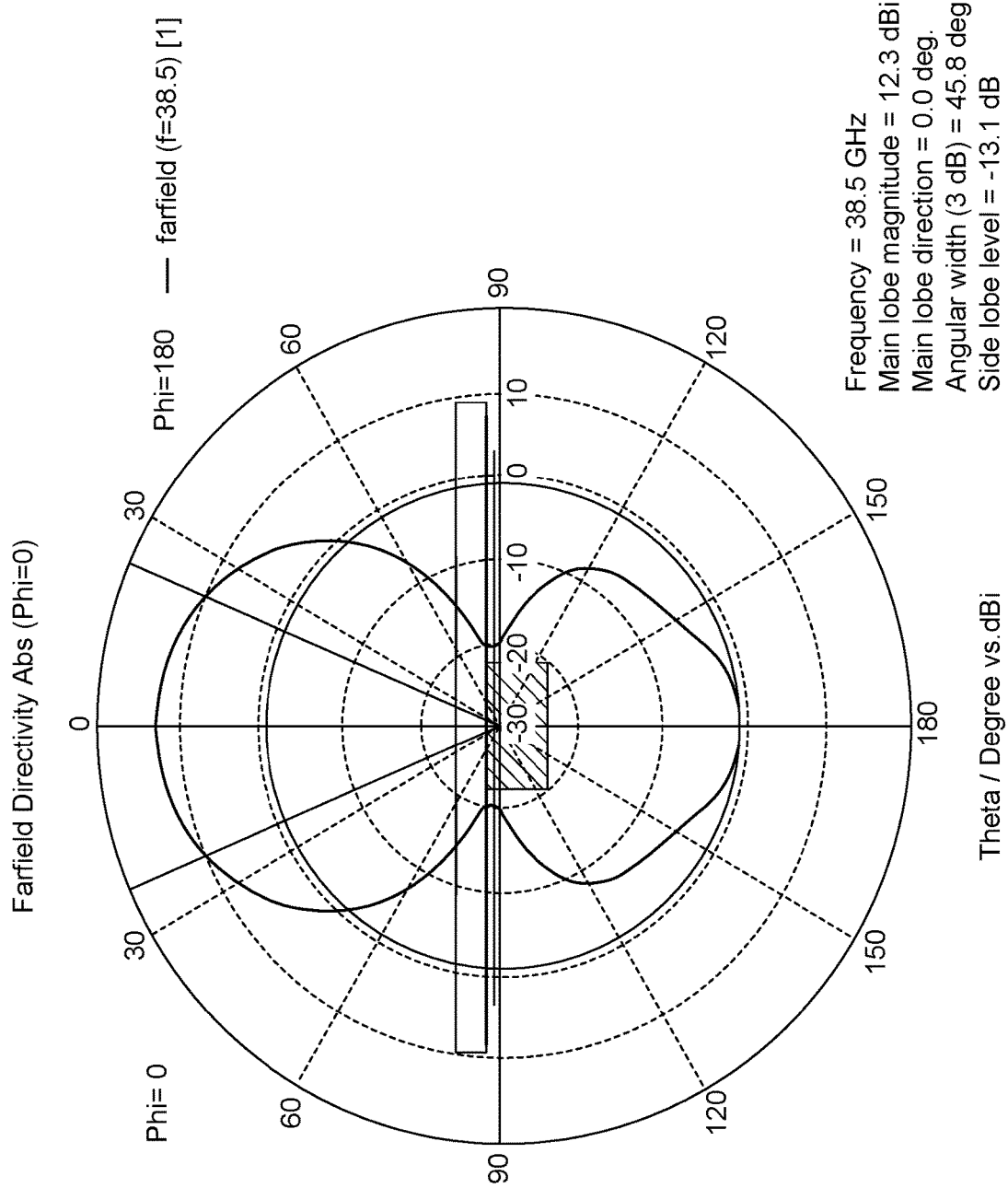
FIG. 11 shows a radiation pattern for the 38 GHz feed antenna.

FIG. 11 shows a radiation pattern for the 38 GHz feed antenna 408.

Figure 12:
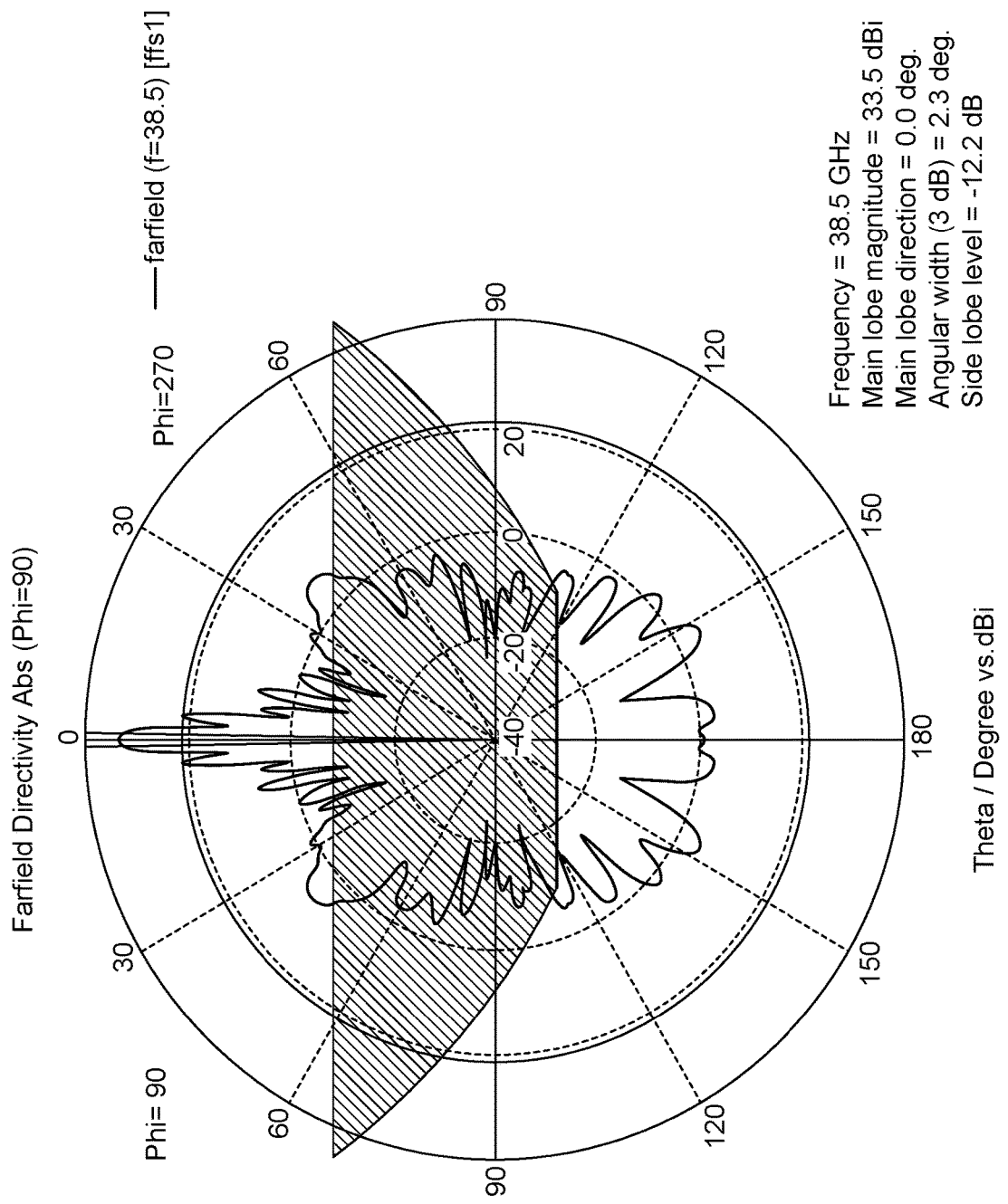
FIG. 12 shows a radiation pattern for the 38 GHz feed antenna when operating with the reflectors of the dual-band antenna system.

FIG. 12 shows a radiation pattern for the 38 GHz feed antenna 408 when operating with the reflectors 402, 403 of the dual-band antenna system 210.

Figure 13:
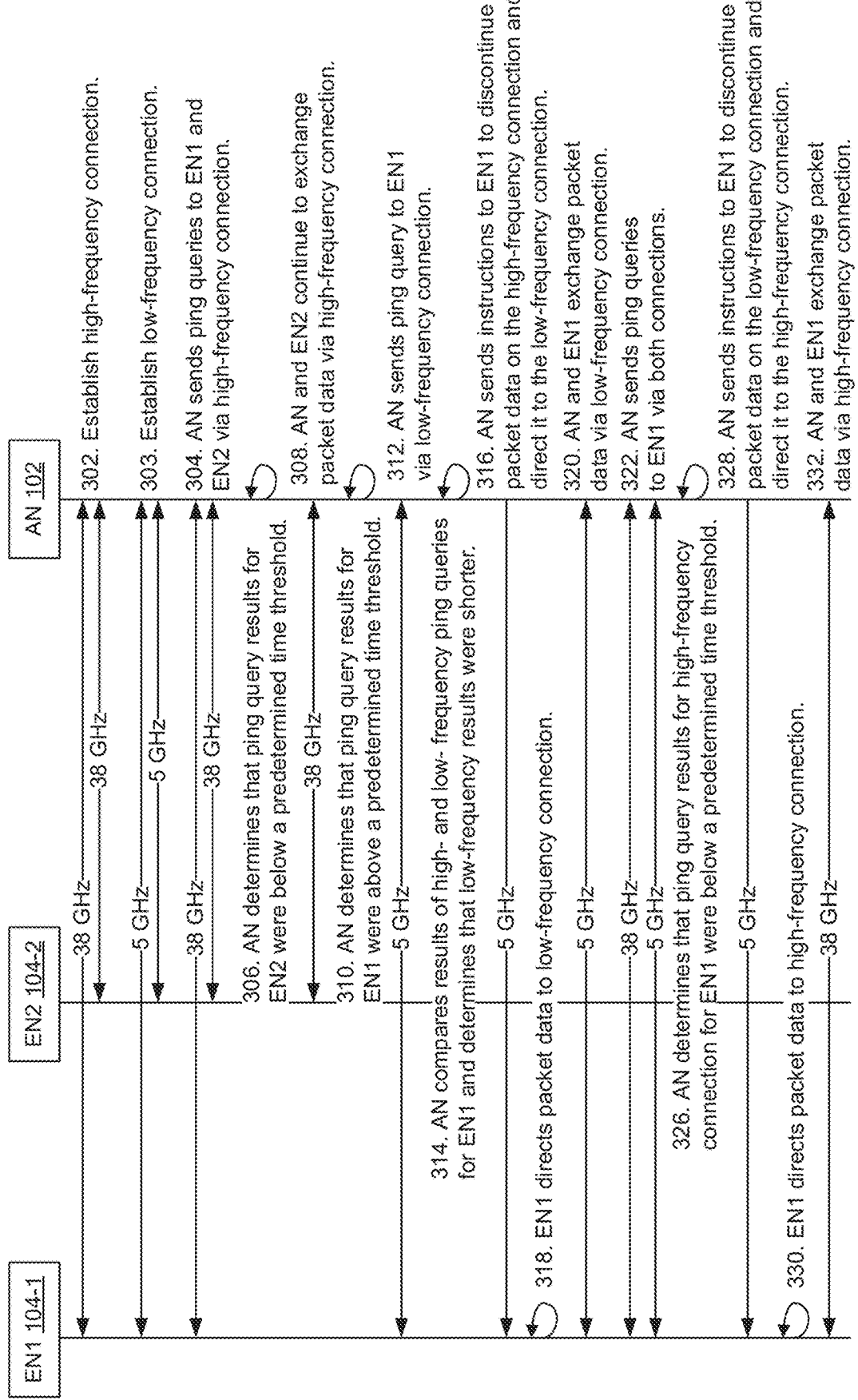
FIG. 13 is a sequence diagram illustrating the process by which failover from a high-frequency data link to a low-frequency data link is arranged and maintained.

FIG. 13 is a sequence diagram illustrating the process by which the failover from the high-frequency data link H to the low-frequency data link L is arranged and maintained. In the illustrated example, two endpoint nodes 104-1 and 104-2 exchange packet data and communicate with one aggregation node 102.

In general, in order for the low frequency link L to perform the routing relatively quickly, the low frequency link L must be kept alive. Then, in general, the control process 206 executing on the network processor 200 of the aggregation node 102 detects that the high frequency link H has been impaired and makes a decision to redirect traffic through the low frequency link L. It then bridges its inputs to the low frequency links L.

In step 302, the aggregation node 102 and the endpoint nodes 104 establish high-frequency data links H between the high frequency antenna system 103 of the aggregation node 102 and the dual-band antenna systems 210 of the endpoint nodes 104. During normal operation of the fixed access network 100, the nodes exchange packet data associated with the different subscribers via the high-frequency data link H.

In step 303, the aggregation node 102 and the endpoint nodes 104 establish low-frequency data links L between the low frequency antenna system 105 of the aggregation node 102 and the dual-band antenna systems 210 of the endpoint nodes. During normal operation, the nodes exchange auxiliary communications such as instructions via the low-frequency data links L, which are executed by the endpoint nodes 104, for example.

In step 304, the aggregation node 102 periodically sends ping queries to the endpoint nodes 104 over the high-frequency data links H. More specifically, the aggregation node 102 sends a query message to each of the endpoint nodes 104, each of which echoes the received query message back to the aggregation node 102 by sending a query response message to the aggregation node 102 in response to receiving the query message. The aggregation node 102 measures the round-trip time for each of the query messages, the round-trip time indicating, for example, the amount of time elapsed between sending the query message and receiving a corresponding query response message.

In general, the aggregation node 102 determines whether the high-frequency data link H is impaired based on the results of the ping queries.

For example, in step 306, the aggregation node 102 determines that the ping query results (e.g. round trip time) for the second endpoint node 104-2 were below a predetermined time threshold and thus the high-frequency data link H is functioning normally. Therefore, in step 308, the aggregation node 102 and the second endpoint node 104-2 continue exchanging packet data via the high-frequency data link H.

On the other hand, in step 310, the aggregation node 102 determines that the ping query results (e.g. round trip time) for the first endpoint node 104-1 were above a predetermined time threshold and thus the high-frequency data link H is impaired (for example, the data link is running too slowly or has been interrupted entirely). Therefore, in step 312, the aggregation node 102 sends a second ping query to the first endpoint node 104-1 over the low-frequency data link L and, in step 314, compares the results of both ping queries to determine which was shorter. In the illustrated example, the aggregation node 102 determines that the ping results for the low-frequency data link L were shorter. As a result, in step 316, the aggregation node 102 sends instructions to the first endpoint node 104-1 to discontinue subscriber or user traffic for that node over the high-frequency data link H and instead direct the packet data to the low-frequency data link L, which the first endpoint node 104-1 does in step 318.

In step 320, the aggregation node 102 and the first endpoint node 104-1 exchange subscriber packet data over the low-frequency data link L.

In step 322, the aggregation node 102 periodically sends ping queries to the first endpoint node 104-1 over both the low- and high-frequency data links L, H. In step 326, the aggregation node 102 determines that the ping query results for the high-frequency data link H were below the predetermined time threshold (and thus the high-frequency data link H has resumed functioning normally). As a result, in step 328, the aggregation node 102 sends instructions via the low-frequency data link L to the first endpoint node 104-1 to discontinue traffic on the low-frequency data link L and direct the packet data instead to the high-frequency data link H, which the first endpoint node 104-1 does in step 330.

Finally, in step 332, the aggregation node 102 and the first endpoint node 104-1 resume exchanging packet data over the high-frequency data link H.

While this invention has been particularly shown and described with references to preferred embodiments thereof, it will be understood by those skilled in the art that various changes in form and details may be made therein without departing from the scope of the invention encompassed by the appended claims.

What is claimed is:

1. A wireless access system, the system comprising:
   endpoint nodes installed at premises; and
   an aggregation node for communicating with the endpoint nodes via high-frequency wireless data links and via low-frequency wireless data links that operate between 1 and 10 Gigahertz;
   wherein the aggregation node comprises, for the high frequency data links, up converters for upconverting signals to high frequency signals of 10 and 300 Gigahertz for transmission to the endpoint nodes and down converters for receiving high frequency signals of 10 and 300 Gigahertz from the endpoint nodes and downconverting the high frequency signals; and
   wherein the aggregation node further comprises, for the low frequency data links, a WiFi chipset for producing WiFi signals for transmission to the endpoint nodes, and processing WiFi signals received from the endpoint nodes;
   wherein the aggregation node and the endpoint nodes exchange packet data via the low-frequency wireless data links in response to determining that the high-frequency wireless data links are impaired; and
   wherein during normal operation of the wireless access system, the aggregation node and the endpoint nodes exchange auxiliary communications via the low-frequency wireless data links, and the aggregation node and the endpoint nodes exchange packet data via the high-frequency wireless data links.

2. The system as claimed in claim 1, wherein the aggregation node and endpoint nodes provide wireless connectivity between user devices at the premises containing the endpoint nodes and an internet service provider by exchanging packet data.

3. The system as claimed in claim 1, wherein the aggregation node and the endpoint nodes exchange packet data via the low-frequency wireless data links in response to determining that the high-frequency wireless data links are impaired.

4. The system as claimed in claim 1, wherein the endpoint nodes comprise dual-band antenna systems for transmitting information to and receiving information from the aggregation node via the high-frequency wireless data links and the low-frequency wireless data links.

5. The system as claimed in claim 1, wherein the aggregation node comprises a phased array antenna system for transmitting information to and receiving information from the endpoint nodes.

6. The system as claimed in claim 1, wherein the aggregation node determines that the high-frequency wireless data links are impaired based on results of ping queries sent from the aggregation node to the endpoint nodes via the high-frequency wireless data links.

7. The system as claimed in claim 1, wherein the aggregation node and the endpoint nodes resume exchanging the packet data via the high-frequency wireless data links in response to determining that the high-frequency wireless data links are no longer impaired.

8. A method of operation of a wireless access system, the method comprising:
  an aggregation node transmitting information to and receiving information from endpoint nodes installed at a premises via high-frequency wireless data links, wherein the aggregation node comprises up converters for upconverting to high frequency signals of 10 and 300 Gigahertz for transmission to the endpoint nodes and down converters for receiving high frequency signals of 10 and 300 Gigahertz from the endpoint nodes and downconverting the high frequency signals; and
  the aggregation node transmitting information to and receiving information from the endpoint nodes via low-frequency wireless data links operating at a frequency between 1 and 10 Gigahertz;
  wherein the aggregation node and the endpoint nodes exchange packet data via the low-frequency wireless data links in response to determining that the high-frequency wireless data links are impaired; and
  wherein during normal operation of the wireless access system, the aggregation node and the endpoint nodes exchange auxiliary communications via the low-frequency wireless data links, and the aggregation node and the endpoint nodes exchange packet data via the high-frequency wireless data links.

9. The method as claimed in claim 8, further comprising the aggregation node and endpoint nodes providing wireless connectivity between user devices at the premises containing the endpoint nodes and an internet service provider by exchanging packet data.

10. The method as claimed in claim 8, further comprising transmitting high-frequency wireless data links using a phased array antenna system of the aggregation node.

11. The method as claimed in claim 8, wherein the aggregation node further comprises one or more auxiliary antennas for maintaining the low-frequency wireless data links.

12. The method as claimed in claim 8, further comprising the endpoint nodes transmitting information to and receiving information from the aggregation node via the high-frequency wireless data links and the low-frequency wireless data links using dual-band antenna systems of the endpoint nodes.

13. The method as claimed in claim 8, further comprising the aggregation node determining that the high-frequency wireless data links are impaired based on results of ping queries sent from the aggregation node to the endpoint nodes via the high-frequency wireless data links.

14. The method as claimed in claim 8, further comprising the aggregation node and the endpoint nodes resuming exchanging the packet data via the high-frequency wireless data links in response to determining that the high-frequency wireless data links are no longer impaired.

15. A wireless access system, the system comprising:
  endpoint nodes installed at premises; and
  an aggregation node for communicating with the endpoint nodes, the aggregation node comprising an antenna system for transmitting information to and receiving information from the endpoint nodes via high-frequency wireless data links operating at a frequency of at least 20 Gigahertz (GHz), and one or more auxiliary antennas for transmitting information to and receiving information from the endpoint nodes via low-frequency wireless data links operating at a frequency between 1 and 10 GHz;
  wherein the aggregation node and the endpoint nodes exchange packet data via the low-frequency wireless data links in response to determining that the high-frequency wireless data links are impaired; and
  wherein during normal operation of the wireless access system, the aggregation node and the endpoint nodes exchange auxiliary communications via the low-frequency wireless data links, and the aggregation node and the endpoint nodes exchange packet data via the high-frequency wireless data links.

16. The system as claimed in claim 15, wherein the endpoint nodes include dual band antennas for maintaining both the high frequency wireless data links and the low-frequency wireless data links.

17. The system as claimed in claim 16, wherein the dual band antennas include feed antennas that illuminate a sub-reflector which then reflects to a main reflector which forms desired antenna pattern and gain.

18. The system as claimed in claim 16, further comprising a dual polarized aperture for transmitting and receiving vertical polarization and one for transmitting and receiving horizontal polarization.

\* \* \* \* \*